(12) United States Patent
Yang et al.

(10) Patent No.: US 9,046,382 B2
(45) Date of Patent: Jun. 2, 2015

(54) POWER CONTROL CIRCUITS AND METHODS

(71) Applicant: Leadtrend Technology Corp., Hsin-Chu (TW)

(72) Inventors: Chen-Lun Yang, Hsin-Chu (TW); Shun-Chin Chou, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 243 days.

(21) Appl. No.: 13/744,377

(22) Filed: Jan. 17, 2013

(65) Prior Publication Data

US 2013/0187621 A1    Jul. 25, 2013

(30) Foreign Application Priority Data

Jan. 20, 2012   (TW) .............................. 101102424 A

(51) Int. Cl.
| | |
|---|---|
| G05F 1/00 | (2006.01) |
| G01D 1/10 | (2006.01) |
| H02M 3/335 | (2006.01) |
| G06F 1/26 | (2006.01) |
| H02M 1/00 | (2006.01) |

(52) U.S. Cl.
CPC .. G01D 1/10 (2013.01); G06F 1/26 (2013.01); H02M 3/33507 (2013.01); H02M 2001/0035 (2013.01); Y02B 70/16 (2013.01)

(58) Field of Classification Search
USPC .............. 323/234, 237, 282–285; 363/19, 20, 363/21.01, 56, 97
See application file for complete search history.

(56) References Cited

U.S. PATENT DOCUMENTS 7,034,513 B2 *   4/2006  Gan et al. ...................... 323/285
2012/0161727 A1   6/2012  Yeh

FOREIGN PATENT DOCUMENTS

CN             102570776 A       7/2012
* cited by examiner

*Primary Examiner* — Adolf Berhane
*Assistant Examiner* — Afework Demisse
(74) *Attorney, Agent, or Firm* — Winston Hsu; Scott Margo

(57) ABSTRACT

Power control circuits and methods are disclosed, suitable for a power supplier. A power control circuit has a clock generator, a phase controller and a power limiter. The clock generator provides a clock signal, substantially determining switching cycles of a power supply. The phase controller outputs a burst signal based on a group reference signal and a burst initiation signal, and makes a burst period corresponding to a burst signal not less than a group reference period corresponding to the group reference signal. The burst signal is capable of switching the power supplier between a switching state and a non-switching state. The power limiter limits the power transferred by the power supply in every switching cycle, during a burst-up duration after the power supply is switched from the non-switching state to the switching state. The burst initiation signal correlates to an output voltage of the power supplier.

17 Claims, 19 Drawing Sheets

POWER CONTROL CIRCUITS AND METHODS

BACKGROUND OF THE INVENTION

1. Field of the Invention

The present invention relates to control methods of a power supply, and more particularly relates to control methods when operating under light load or no load conditions of the power supply.

2. Description of the Prior Art

A power supply is used to convert power to within a specific level to power electronic devices or components. The power consumed by the power supply should be as low as possible to improve conversion efficiency. Even small power consumption will decrease conversion efficiency by a great deal, particularly under light load or no load conditions of the power supply. Consequently, a major consideration of designing the power supply is to lower power consumption for light load or no load conditions of the power supply.

A switching mode power supply is designed to operate in skip mode or burst mode under light load or no load conditions. FIG. 1 illustrates a flyback power supply 60 of the prior art. A power management controller 74 controls a power switch 72 to store power from AC input or deliver power to output through a transformer 65. A compensation signal $S_{COM}$ is controlled by an output voltage $V_{OUT}$ through a feedback loop comprising LT431 and a photo coupler 63. FIG. 2 is a simplified block diagram illustrating a power management controller 74a of the prior art according to one embodiment of FIG. 1. When a burst signal $S_{BST}$ is asserted, a clock generator 86 generates a clock signal $S_{CLK}$ to periodically switch the power switch 72 on and off by a logic controller 62; this is referred to as a switching state. The clock signal $S_{CLK}$ substantially defines switching cycles of the power supply 60. On time of the power switch 72 is controlled by a limiting signal $S_{CS-L}$ and a comparator 82. The limiting signal $S_{CS-L}$ is generated by a level shifter 67, and can be regarded as equivalent to the compensation signal $S_{COM}$. A resistor 61 forms a path to a power source Vcc for the compensation signal $S_{COM}$. When the compensation signal $S_{COM}$ is lower than a burst reference voltage $V_{BST-REF}$, a comparator 84 sets a burst signal $S_{BST}$ to logic 0, hence turning off the power switch 72 regardless of the clock signal $S_{CLK}$, and maintaining the power switch 72 in a non-switching state. FIG. 3 illustrates possible waveforms of signals $S_{CLK}$, $V_G$, $V_{CS}$ of the power management controller 74a of FIG. 2 operating under light load or no load. As the compensation signal $S_{COM}$ varies, a control signal $V_G$ of the power management controller 74a forces the power switch 72 to conduct for one or consecutive switching cycles, then turns off the power switch 72 for the following one or consecutive switching cycles. The above described mode is referred to as skip mode or burst mode, and is referred to as burst mode hereinafter.

Burst mode is dedicated to stopping consecutive mostly ineffective switching cycles and focuses power conversion on consecutive more effective switching cycles. Burst mode can cause annoying audible noise without proper control of power conversion in effective switching cycles. For instance, audible noise occurs if the sum of the switching state period $T_B$ and the non-switching state period $T_S$, period $T_G$, corresponding to frequency $f_G$, falls within the audible frequency range.

SUMMARY OF THE INVENTION

The embodiment of the present invention presents a power control circuit adapted to a power supply. The power control circuit comprises a clock generator, a phase controller, a power limiter. The clock generator provides a clock signal to substantially determine switching cycles of the power supply. The phase controller generates a burst signal having a period not smaller than a period of a group reference signal according to the group reference signal and a burst initiation signal. The burst signal switches the power supply to either a switching state or a non-switching state. The power limiter limits a power output of the power supply in every switching cycle during a burst up duration after the power supply switches from the non-switching state to the switching state. The burst up duration is not smaller than the period of the group reference signal. The burst initiation signal relates to a power output of the power supply.

The embodiment of the present invention also extends to a power control method adapted to a power supply, comprising: generating a burst initiation signal related to a power output of the power supply; generating a burst signal having a period not smaller than a period of a group reference signal according to the burst initiation signal and the group reference signal, wherein the burst signal can switch the power supply to either a non-switching state or a switching state; limiting the power output of the power supply in every switching cycle within a burst up duration after the power supply switches from the non-switching state to the switching state, wherein the burst up duration is not smaller than the period of the group reference signal.

The embodiment of the present invention extends further to a power control circuit adapted to a power supply, comprising: a clock generator, a group reference signal generator, a burst timer, and a power limiter. The clock generator provides a clock signal for substantially determining switching cycles of the power supply. The group reference signal generator generates a group reference signal having a period longer than a switching cycle of the clock signal. The burst timer determines a burst up duration after the power supply switches from a non-switching state to a switching state, wherein the burst up duration is not smaller than the period of the group reference signal. The power limiter limits a power output of the power supply in every switching cycle within the burst up duration.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention are illustrated by a flyback (converter) power supply, but the invention is not limited thereto, and may be adapted to, boost, buck, or other converter topologies.

Figure 1:
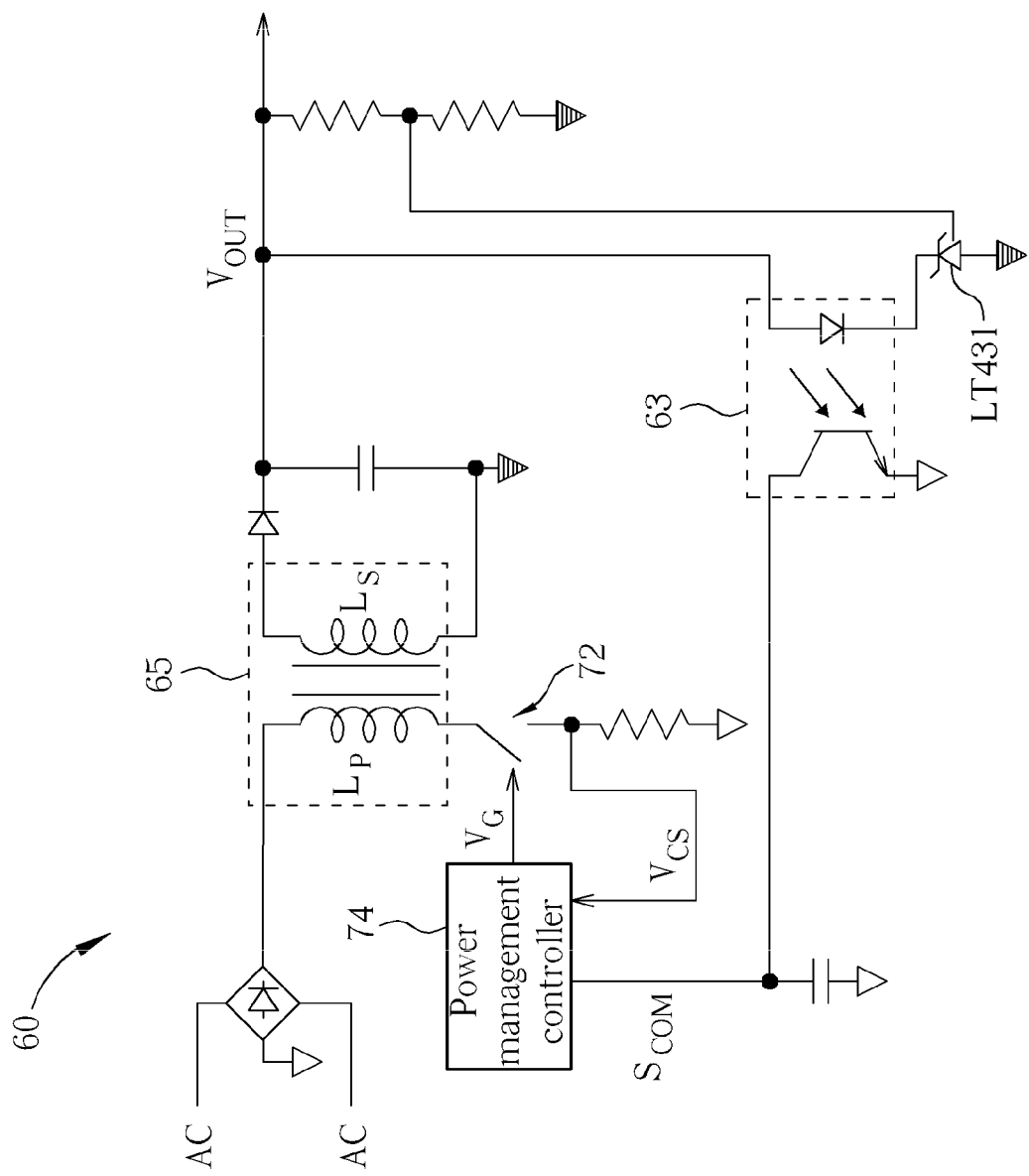
FIG. 1 is a diagram illustrating a flyback power supply of the prior art.
Figure 4:
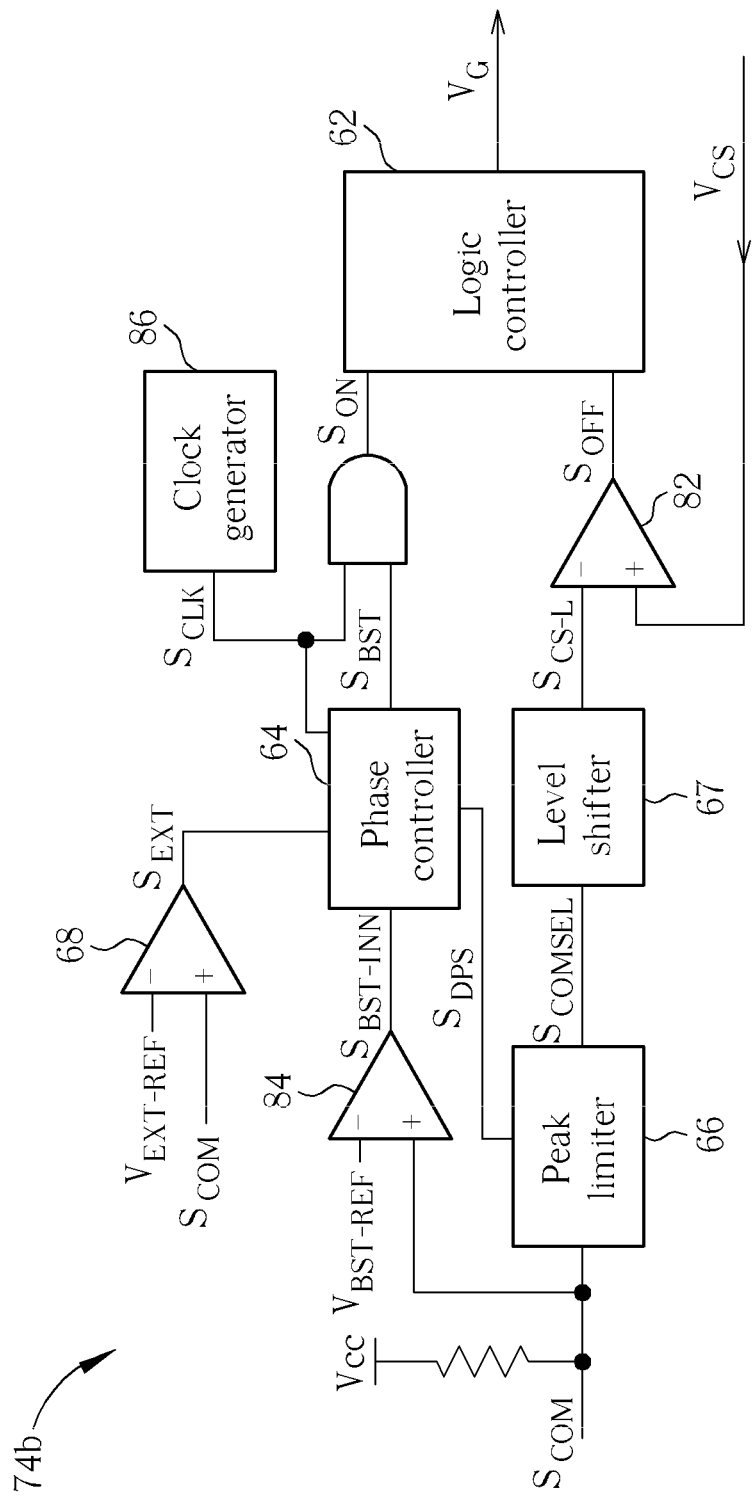
FIG. 4 is a diagram illustrating a power management controller according to the embodiment of the power supply of FIG. 1.

FIG. 4 is a simplified block diagram illustrating a power management controller 74b according to the embodiment of the power supply 60 of FIG. 1. The power management controller 74b can limit group frequency $f_G$ to lower than a certain value. For instance, group frequency $f_G$ is lower than 1 kHz to reduce audible noise within harmonic frequencies of $f_G$ between 5 kHz and 15 kHz range.

Figure 2:
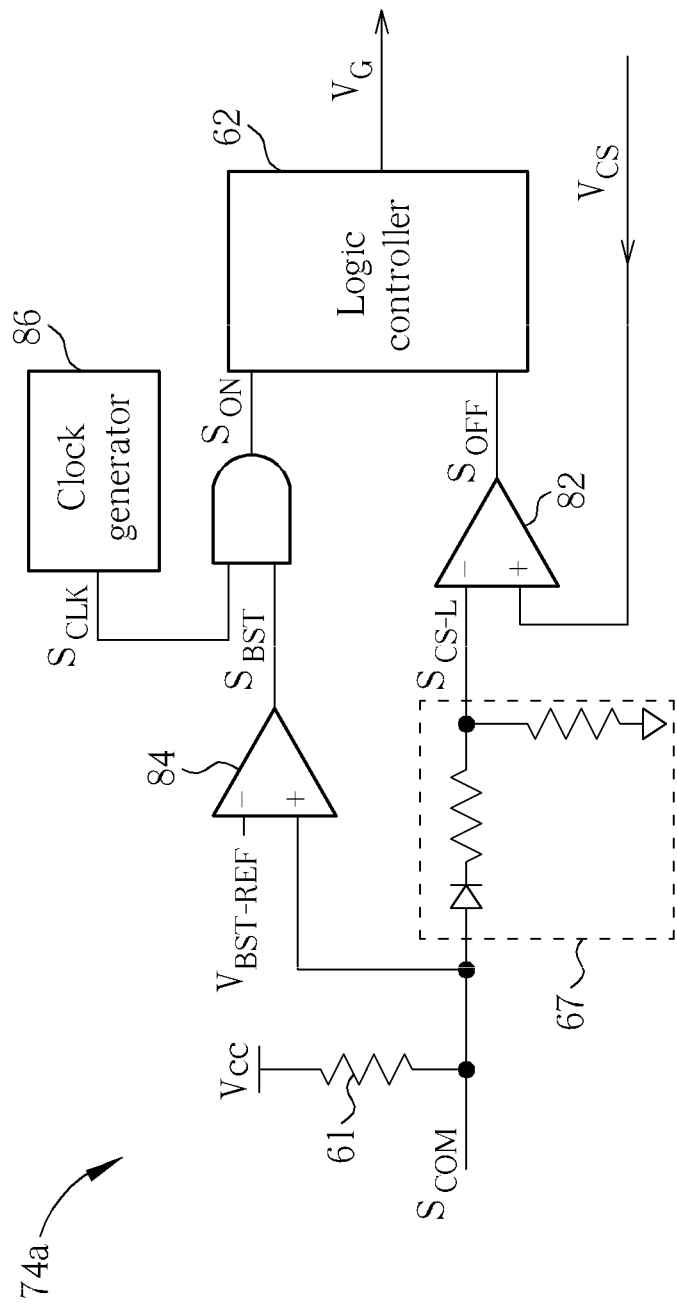
FIG. 2 is a diagram illustrating a power management controller of the prior art.
Figure 3:
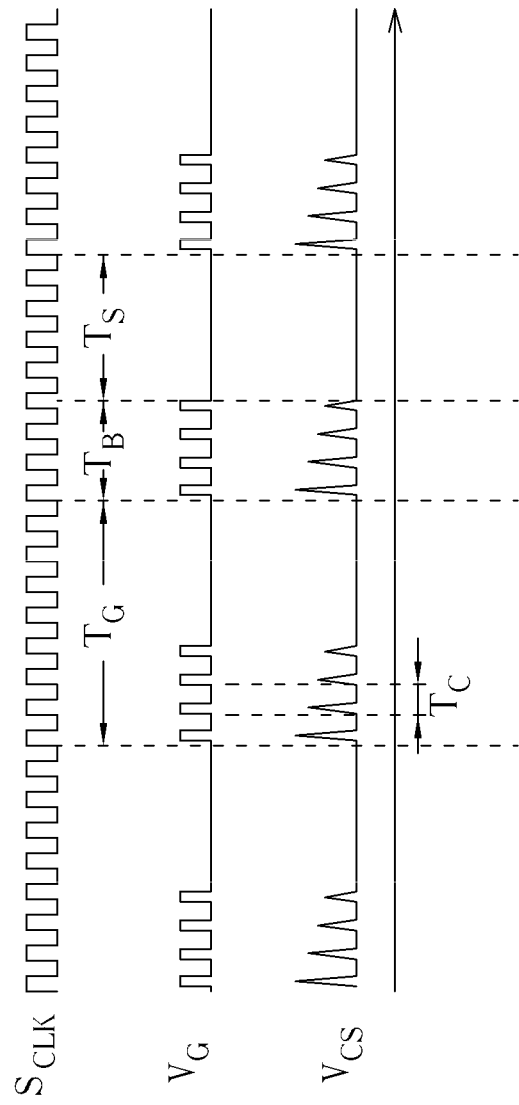
FIG. 3 is a diagram illustrating possible signal waveforms of the power management controller of FIG. 2 operating under light load or no load.

Comparing FIG. 4 and FIG. 2, FIG. 4 comprises a phase controller 64, a peak limiter 66, and an exit comparator 68. Other components are well known to those of ordinary skill in the art.

The phase controller 64 comprises three input terminals, individually receiving a clock signal $S_{CLK}$ (from a clock generator 86, a burst initiation signal $S_{BST-INN}$ from a comparator 84, and an exit signal $S_{EXT}$ from an exit comparator 68, and hence generating a burst signal $S_{BST}$ and a suppression signal $S_{DPS}$. The power supply 60 should switch to a non-switching state or to a switching state when the burst initiation signal $S_{BST-INN}$ changes, but the phase controller 64 may or may not change the state of the burst signal $S_{BST}$ instantly. The state of the burst signal $S_{BST}$ is changed according to a phase difference of the burst initiation signal $S_{BST-INN}$ and a group reference signal $S_{SCLK}$. Under some circumstances, the phase controller 64 may enable the suppression signal $S_{DPS}$ to limit the peak of a current sense signal $V_{CS}$ to be a certain value and to not vary with a compensation signal $S_{COM}$ by the peak limiter 66. Detailed illustration of the phase controller 64 and the peak limiter 66 will be shown in a later section.

Figure 5:
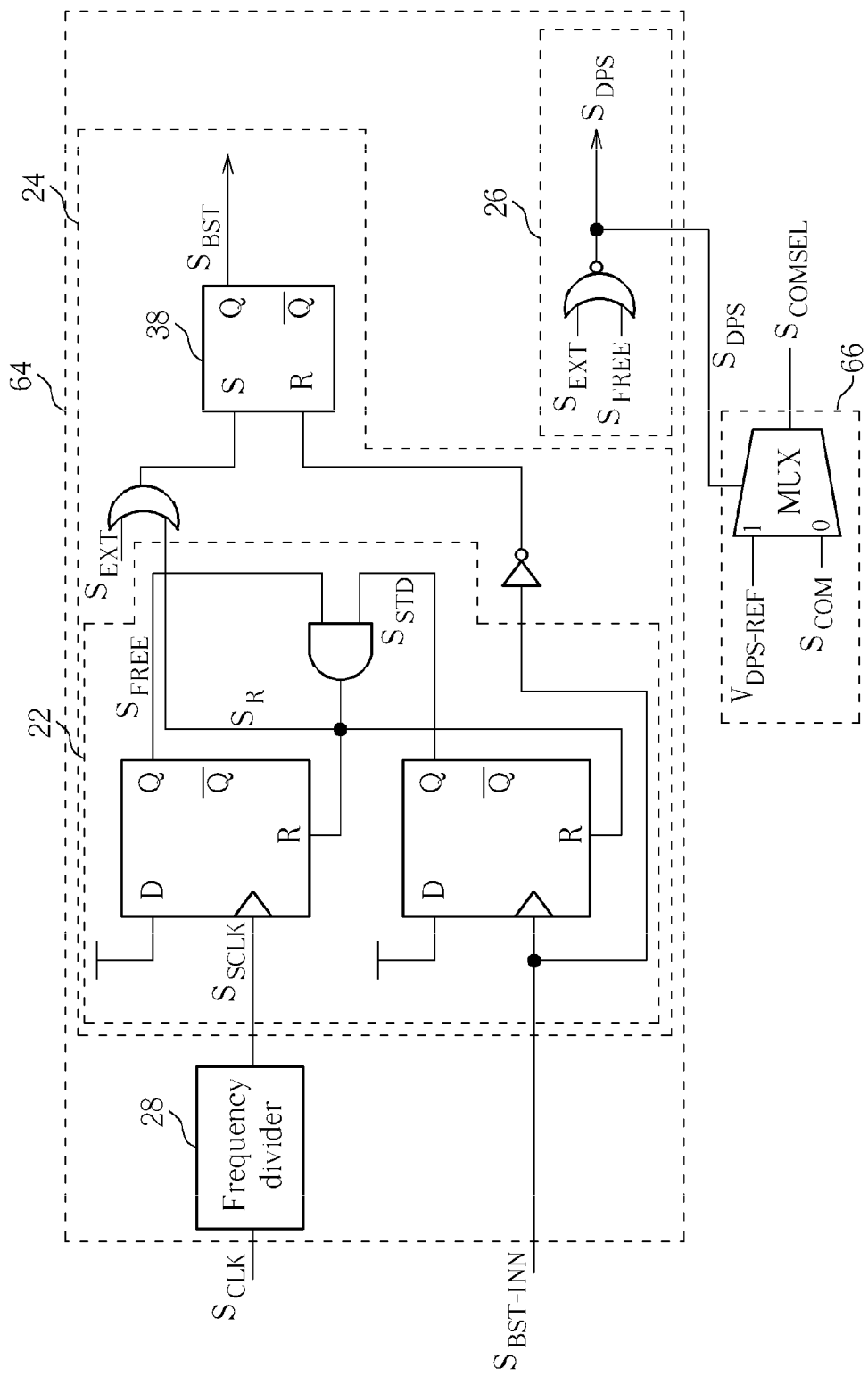
FIG. 5 is a diagram illustrating the phase controller and the peak limiter of FIG. 4.

FIG. 5 illustrates a simplified block diagram of the phase controller 64 and the peak limiter 66 of FIG. 4.

The phase controller 64 comprises a frequency divider 28, a suppression signal generator 26, and a frequency limiter 24. The frequency divider 28 generates the group reference signal $S_{SCLK}$ with a frequency lower than the clock signal $S_{CLK}$ according to the clock signal $S_{CLK}$. For instance, the frequency of the group reference signal $S_{SCLK}$ is set to 1 kHz when the frequency of the clock signal $S_{CLK}$ is 25 kHz. The suppression signal generator 26 sets the suppression signal $S_{DPS}$ to logic 0 when a release signal $S_{FREE}$ or the exit signal $S_{EXT}$ is logic 1.

The frequency limiter 24 limits the frequency of the burst signal $S_{BST}$ to be lower than the frequency of the group reference signal $S_{SCLK}$. The frequency limiter 24 comprises a phase comparator 22 to compare the phase difference of the group reference signal $S_{SCLK}$ and the burst initiation signal $S_{BST-INN}$. In FIG. 5, the phase comparator 22 compares the time difference of the rising edge of the group reference signal $S_{SCLK}$ and the rising edge of the burst initiation signal $S_{BST-INN}$. If the group reference signal $S_{SCLK}$ rises earlier, the release signal $S_{FREE}$ is asserted (logic 1). On the contrary, if the burst initiation signal $S_{BST-INN}$ rises earlier, a standby signal $S_{STD}$ is asserted.

Figure 6:
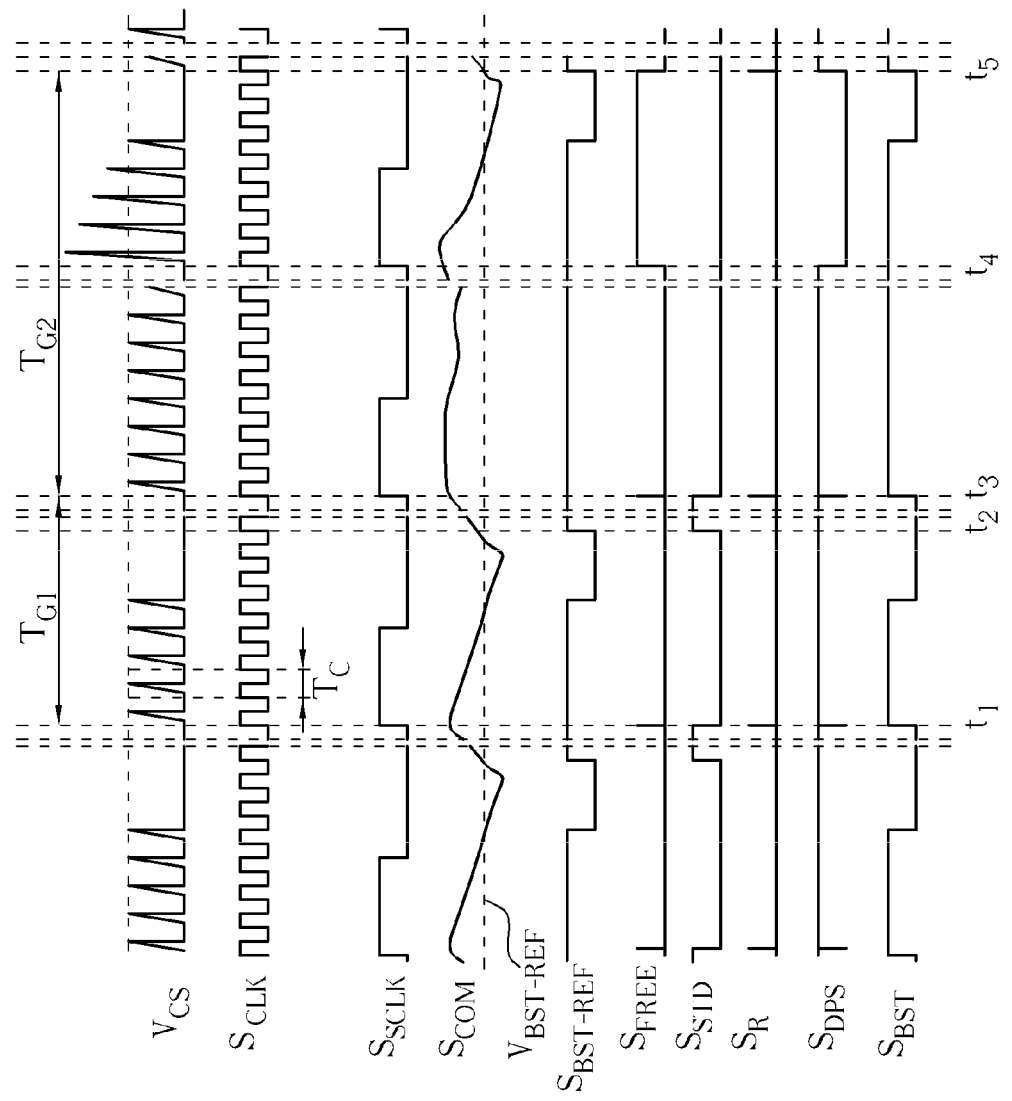
FIG. 6 is a diagram illustrating possible signal waveforms under different load conditions of the power management controller of FIG. 4.

FIG. 6 illustrates possible signal waveforms under different load conditions of the power management controller 74b of FIG. 4 to explain the operation of circuit of FIG. 5. From top to bottom, FIG. 6 shows the current sense signal $V_{CS}$, the clock signal $S_{CLK}$, the group reference signal $S_{SCLK}$, the compensation signal $S_{COM}$, the burst initiation signal $S_{BST-INN}$, the release signal $S_{FREE}$, the standby signal $S_{STD}$, a reset signal $S_R$, the suppression signal $S_{DPS}$, and the burst signal $S_{BST}$. Other waveforms can be inferred from the assumed waveform of the compensation signal $S_{COM}$, of FIG. 6 with reference to the circuit of FIG. 1, FIG. 4, and FIG. 5.

As illustrated in group period $T_{G1}$ from $t_1$ to $t_3$, even though the compensation signal $S_{COM}$ has risen above a burst reference voltage $V_{BST-REF}$, the burst signal $S_{BST}$ does not rise, and the power supply 60 remains in the non-switching state until the reference clock signal $S_{SCLK}$ rises at $t_3$. The group frequency (inverse of group period $T_{G1}$) is equal to the frequency of the group reference signal $S_{SCLK}$.

As illustrated in group period $T_{G2}$ from $t_3$ to $t_5$, due to the release signal $S_{FREE}$ having risen at $t_4$, the burst signal $S_{BST}$ rises as the compensation signal $S_{COM}$ rises above the burst reference voltage $V_{BST-REF}$. The group frequency (inverse of group period $T_{G2}$) is lower than the frequency of the group reference signal $S_{SCLK}$.

Concluding from group period $T_{G1}$ and $T_{G2}$, the burst signal $S_{BST}$ does not rise before the rising edge of the group reference signal $S_{SCLK}$. Therefore, the burst signal $S_{BST}$ corresponds to a group frequency not higher than the frequency of the group reference signal $S_{SCLK}$.

As illustrated, at $t_1$ and $t_3$, peaks of the current sense signal $V_{CS}$ remain at a fixed value and do not vary with the compensation signal $S_{COM}$, even though the power supply 60 is in the switching state. The reason is that whenever the burst signal $S_{BST}$ is asserted, the reset signal $S_R$ is also asserted, thereby disasserting the release signal $S_{FREE}$ and asserting the suppression signal $S_{DPS}$, which causes an input signal $S_{COMSEL}$ of level shifter 67 to be fixed at a reference voltage $V_{DPS-REF}$. At $t_4$, the release signal $S_{FREE}$ is asserted, so the input signal $S_{COMSEL}$ of level shifter 67 becomes the compensation signal $S_{COM}$ coming from the peak limiter 66, and peaks of the current sense signal $V_{CS}$ vary with the compensation signal $S_{COM}$.

In FIG. 4, the power supply 60 should enter the switching state under heavy load conditions instantly when the compensation signal $S_{COM}$ is above an exit reference voltage $V_{EXT-REF}$. For instance, the burst reference voltage $V_{BST-REF}$ is 2V and the exit reference voltage $V_{EXT-REF}$ is 3V. In FIG. 5, when the exit signal $S_{EXT}$ is asserted, the burst signal $S_{BST}$ is also asserted, and the compensation signal $S_{COM}$ of the peak limiter 66 becomes the input signal $S_{COMSEL}$.

Figure 7:
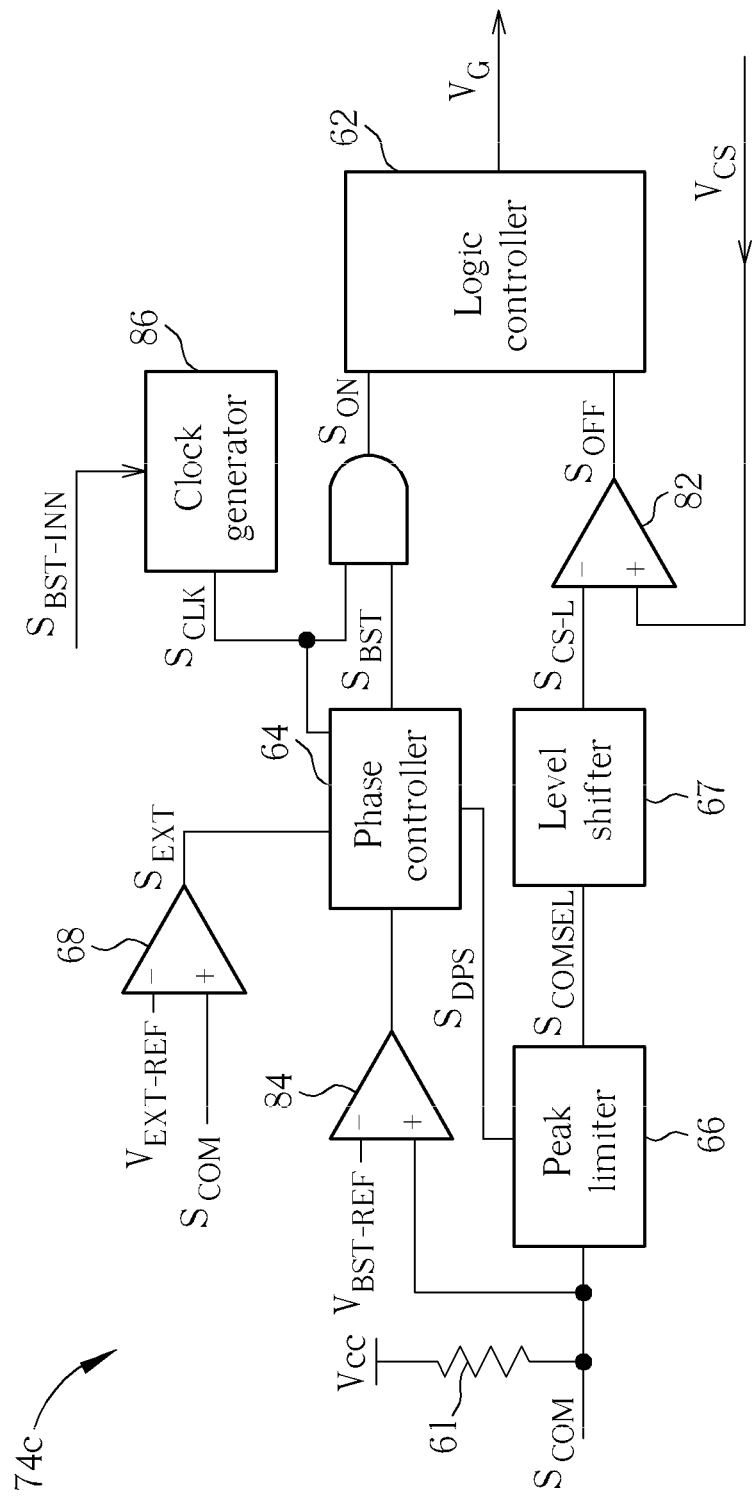
FIG. 7 is a diagram illustrating a power management controller adapted to the power supply of FIG. 1 of the present invention.
Figure 8:
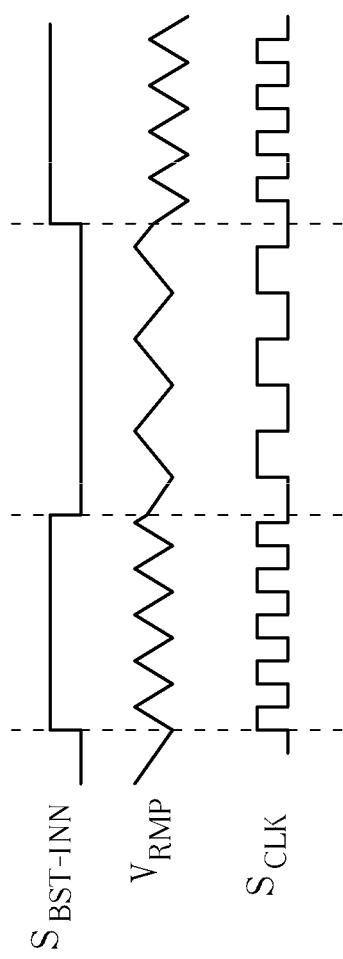
FIG. 8 is a diagram illustrating signal waveforms related to a clock generator of FIG. 7.

FIG. 7 is one embodiment of a power management controller 74c adapted to the power supply 60 of FIG. 1 of the present invention. FIG. 7 is similar to FIG. 4, the difference being that the clock generator 86a in FIG. 7 receives the burst initiation signal $S_{BST-INN}$. The clock generator 86a generates the clock signal $S_{CLK}$ with its frequency varying with the state of the burst initiation signal $S_{BST-INN}$. FIG. 8 shows waveforms of the clock generator 86a of FIG. 7. When the burst initiation signal $S_{BST-INN}$ is asserted, the clock signal $S_{CLK}$ is at a normal frequency higher than a reduced frequency when the burst initiation signal $S_{BST-INN}$ is disasserted. The function is achieved by varying the slope of a ramp signal $V_{RMP}$ as shown in FIG. 8. In another embodiment, the clock generator generates the clock signal $S_{CLK}$, with its frequency varying with the state of the burst signal $S_{BST}$. One of the advantages of the design is to save power in the non-switching state. Another advantage is to reduce noise in burst mode. When in burst mode, the frequency of the group reference signal $S_{SCLK}$ may not be a fixed value, but depends on the burst initiation signal $S_{BST-INN}$ or the disasserted duration of the burst signal $S_{BST}$. Therefore the group frequency may jitter and disperse audio energy.

Figure 9:
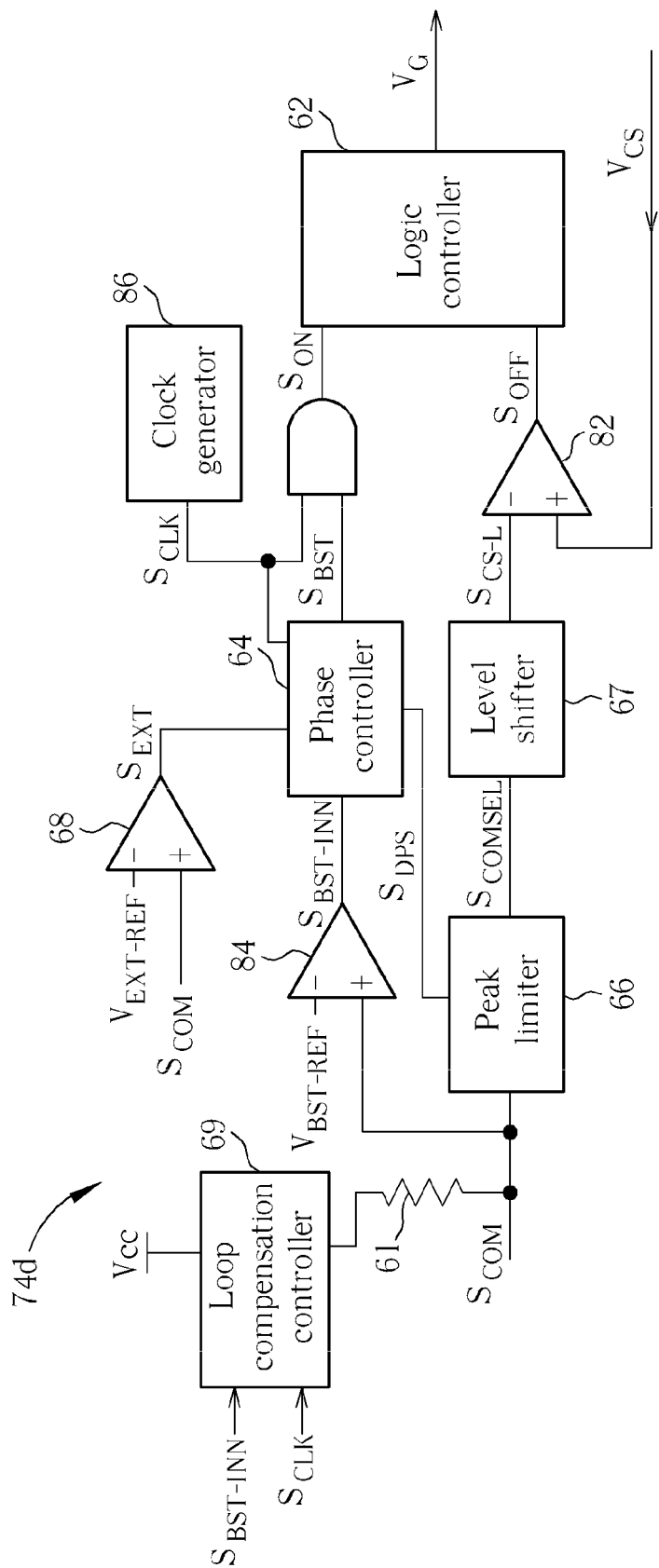
FIG. 9 is a diagram illustrating a power management controller adapted to the power supply of FIG. 1 of the present invention.
Figure 10:
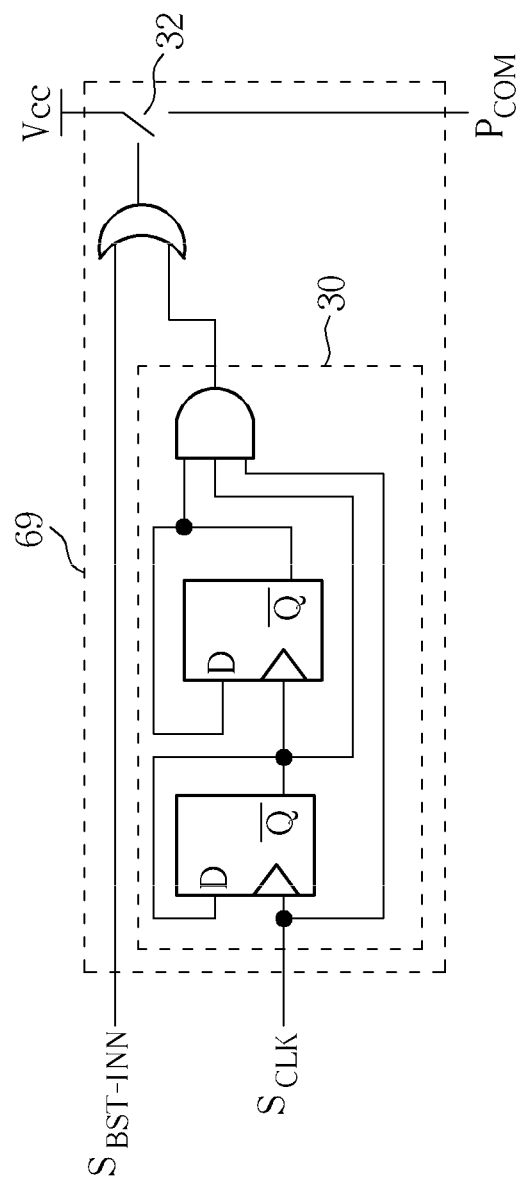
FIG. 10 is a diagram illustrating the loop compensation controller of FIG. 9.

FIG. 9 is a power management controller 74d adapted to the power supply 60 of FIG. 1 of the present invention. FIG. 9 is similar to FIG. 4, the difference being an additional loop compensation controller 69 connected between a resistor 61 and a power source Vcc. FIG. 10 illustrates the loop compensation controller 69 of FIG. 9. When the burst initiation signal $S_{BST-INN}$ is asserted, a switch 32 is short circuited. The short circuited switch 32 provides the power source Vcc to the compensation signal $S_{COM}$. When the burst initiation signal $S_{BST-INN}$ is disasserted, and the power supply 60 operates in the non-switching state, a divider 30 enables clock signal $S_{CLK}$ to short circuit the switch 32 for one switching cycle once every four switching cycles, and the switch 32 remains open circuited for the rest of the time. In so doing, more power can be saved in the non-switching state.

Figure 11:
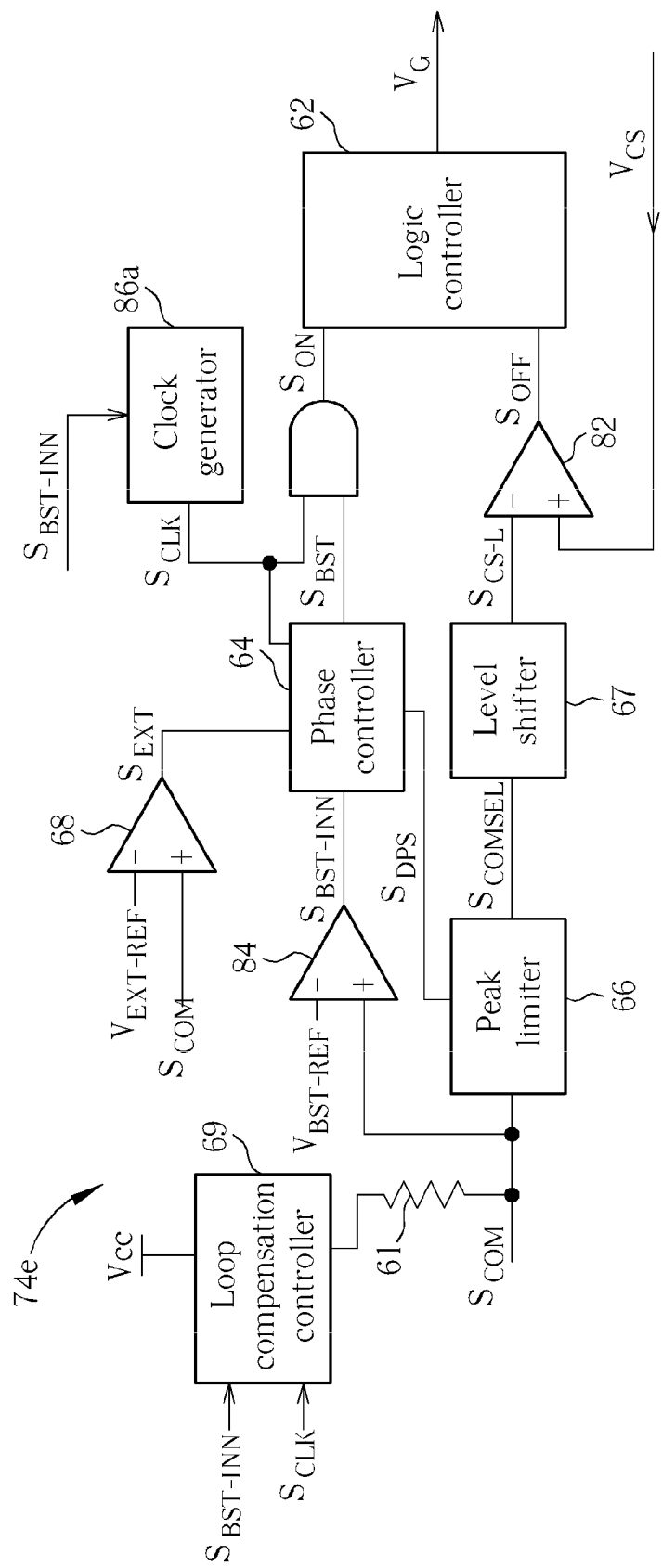
FIG. 11 is a diagram illustrating a power management controller adapted to the present invention.

FIG. 11 is a power management controller 74e adapted to the present invention. FIG. 11 integrates parts of circuits in FIG. 4, FIG. 7, and FIG. 9. Operation of the circuit in FIG. 11 can be inferred from the illustration and explanation of FIG. 4, FIG. 7, and FIG. 9.

Figure 12:
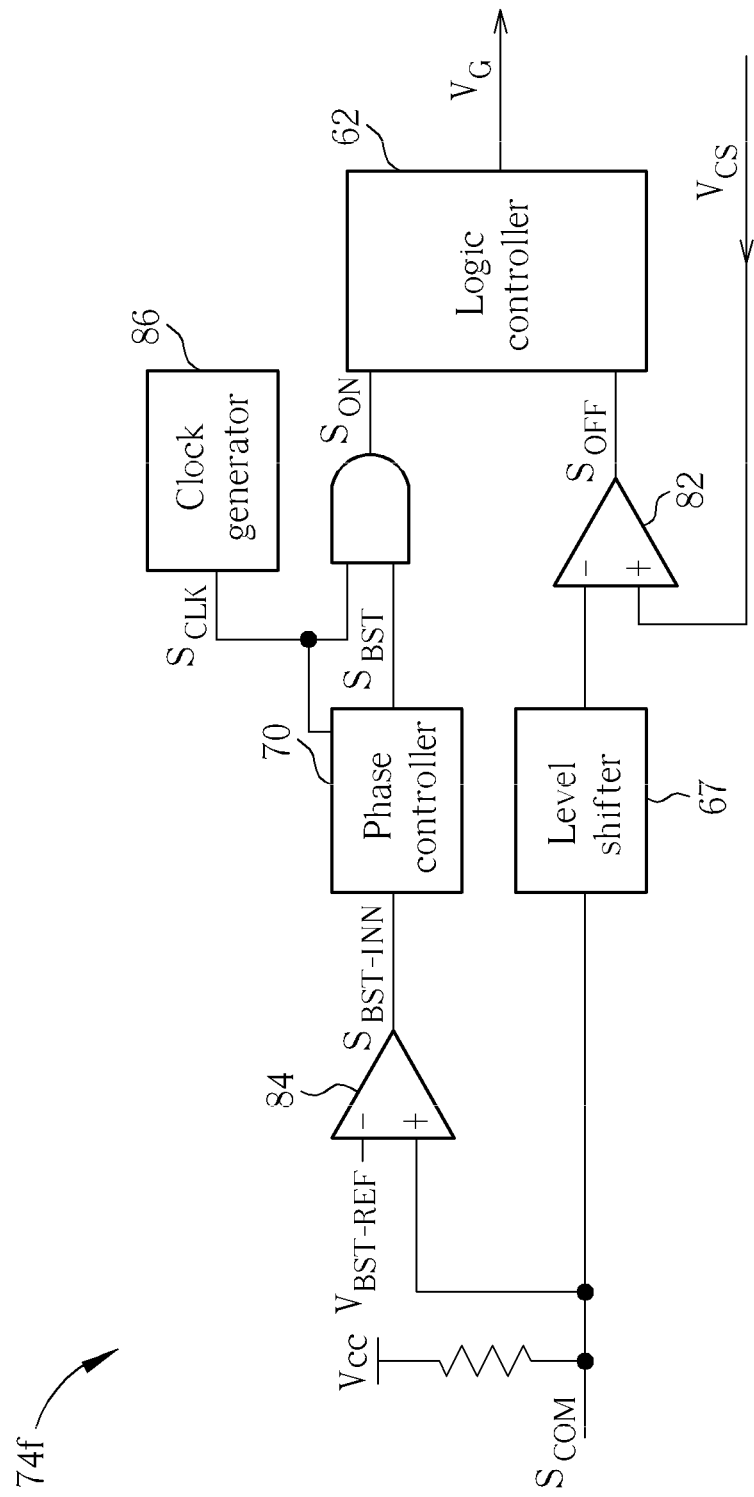
FIG. 12 is a diagram illustrating a power management controller adapted to the power supply of FIG. 1 of the present invention.
Figure 13:
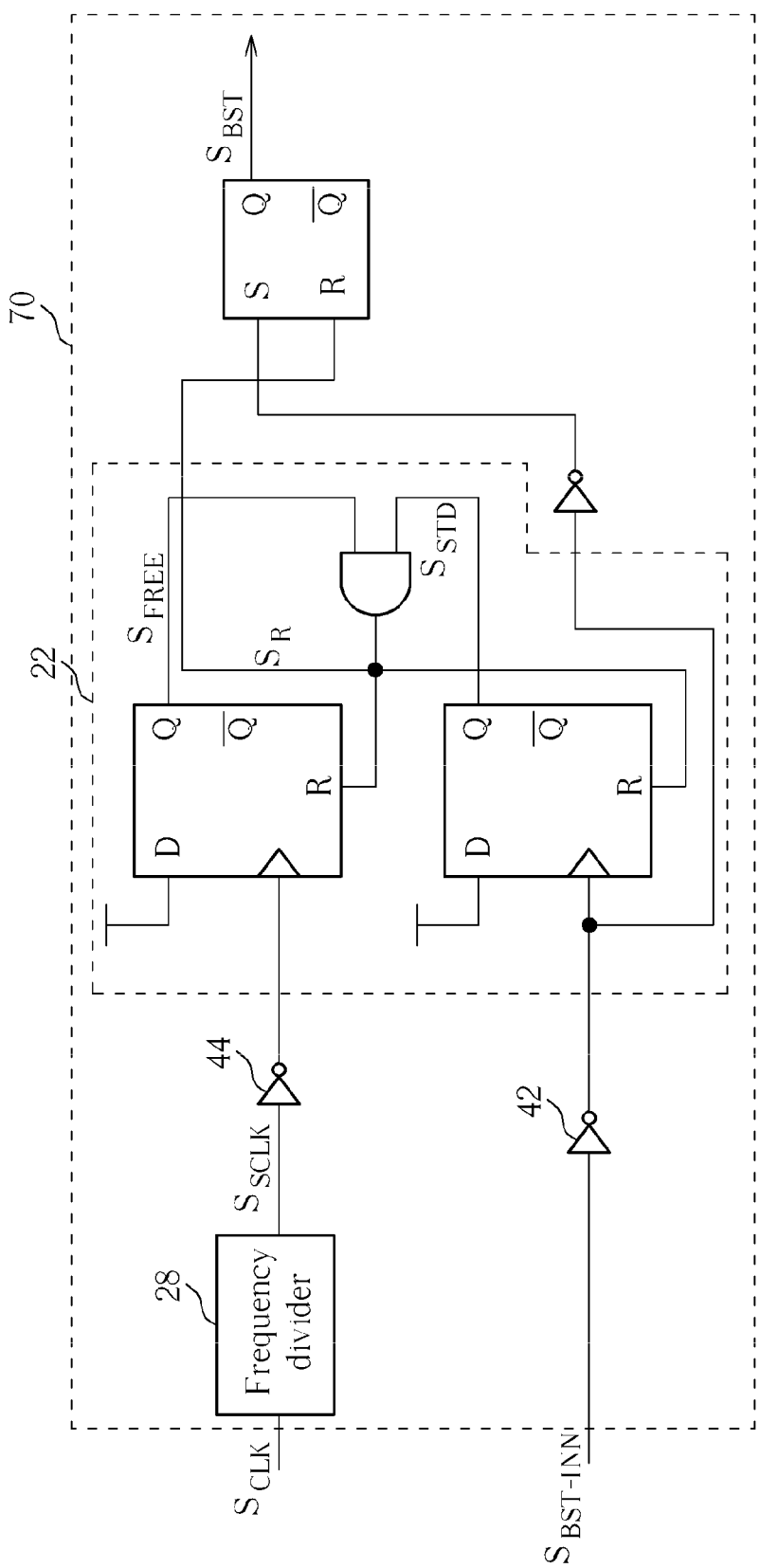
FIG. 13 is a diagram illustrating a phase controller of FIG. 12.

FIG. 12 is a power management controller 74f adapted to the power supply 60 of FIG. 1 of the present invention. FIG. 13 illustrates a phase controller 70 of FIG. 12. The phase controller 64 compares the rising edges of the group reference signal $S_{SCLK}$ and the burst initiation signal $S_{BST-INN}$. The phase controller 70 of FIG. 13 comprises inverters 42 and 44. The phase controller compares the falling edges of the group reference signal $S_{SCLK}$ and the burst initiation signal $S_{BST-INN}$. The phase controller 70 limits the frequency of two consecutive falling edges of the burst signal $S_{BST}$ to be smaller than the frequency of the group reference signal $S_{SCLK}$.

Figure 14:
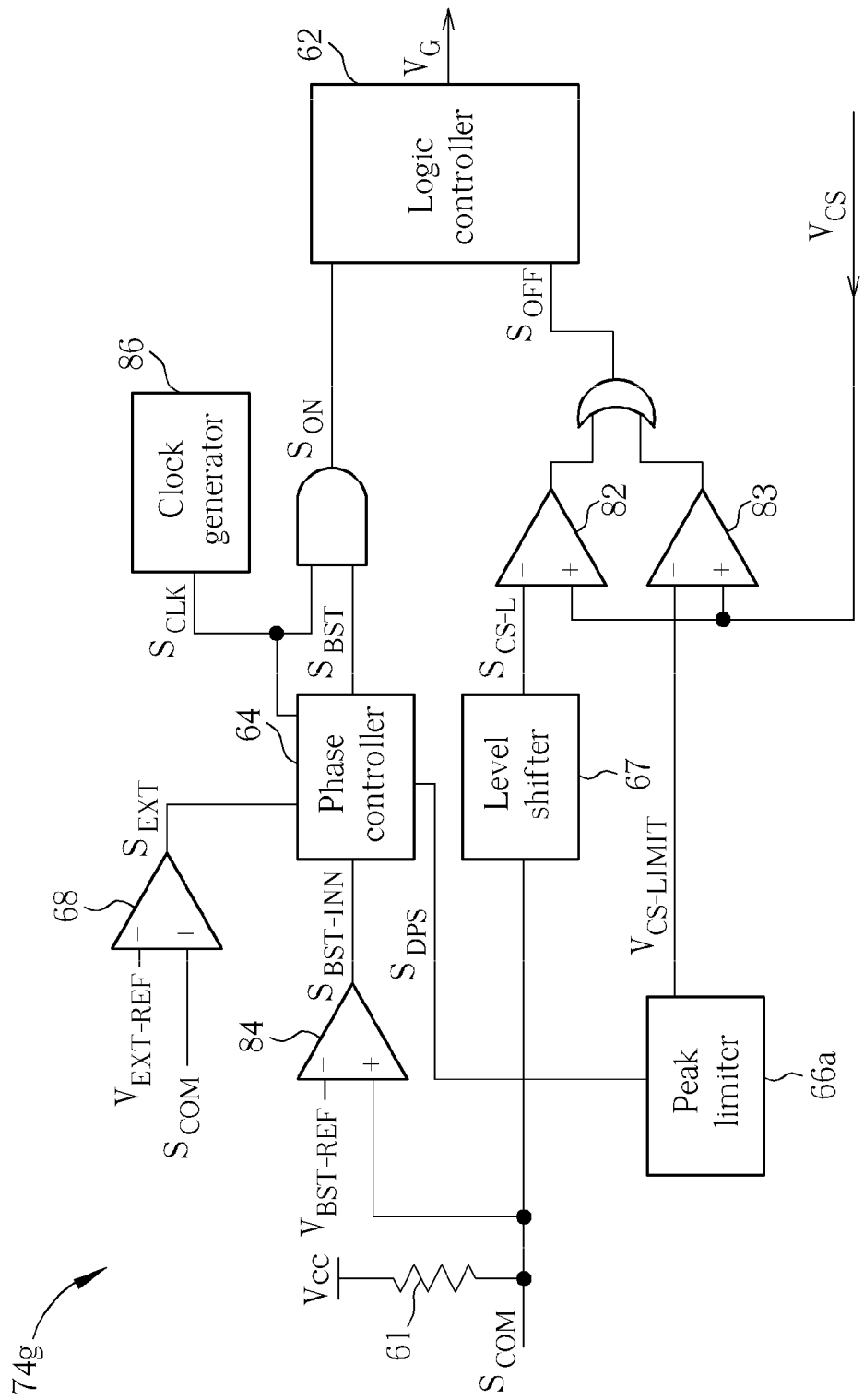
FIG. 14 is a diagram illustrating a power management controller adapted to the power supply of FIG. 1 of the present invention.

FIG. 14 is a power management controller 74g adapted to the power supply 60 of FIG. 1 of the present invention. The burst signal $S_{BST}$ switches the power supply 60 between the switching state and the non-switching state. FIG. 14 is similar to the embodiments hereinbefore. A phase controller 64a in FIG. 14 provides the group reference signal $S_{SCLK}$ and limits the group period corresponding to the burst signal $S_{BST}$ to be not smaller than the period of the group reference signal $S_{SCLK}$. The period indicates the duration between two consecutive rising edges or falling edges of the corresponding signal. The phase controller 64a also generates the suppression signal $S_{DPS}$ to set a peak limit signal $V_{CS-LIMIT}$ of a peak limiter 66a. A comparator 83 limits the current sense signal $V_{CS}$ to be smaller than the peak limit signal $V_{CS-LIMIT}$ in every switching cycle (equivalent to the cycle of the clock signal $S_{CLK}$). So, the peak limiter 66a and the comparator 83 can be regarded as a power limiter, limiting the power conversion of the power supply 60 in every switching cycle.

Figure 15:
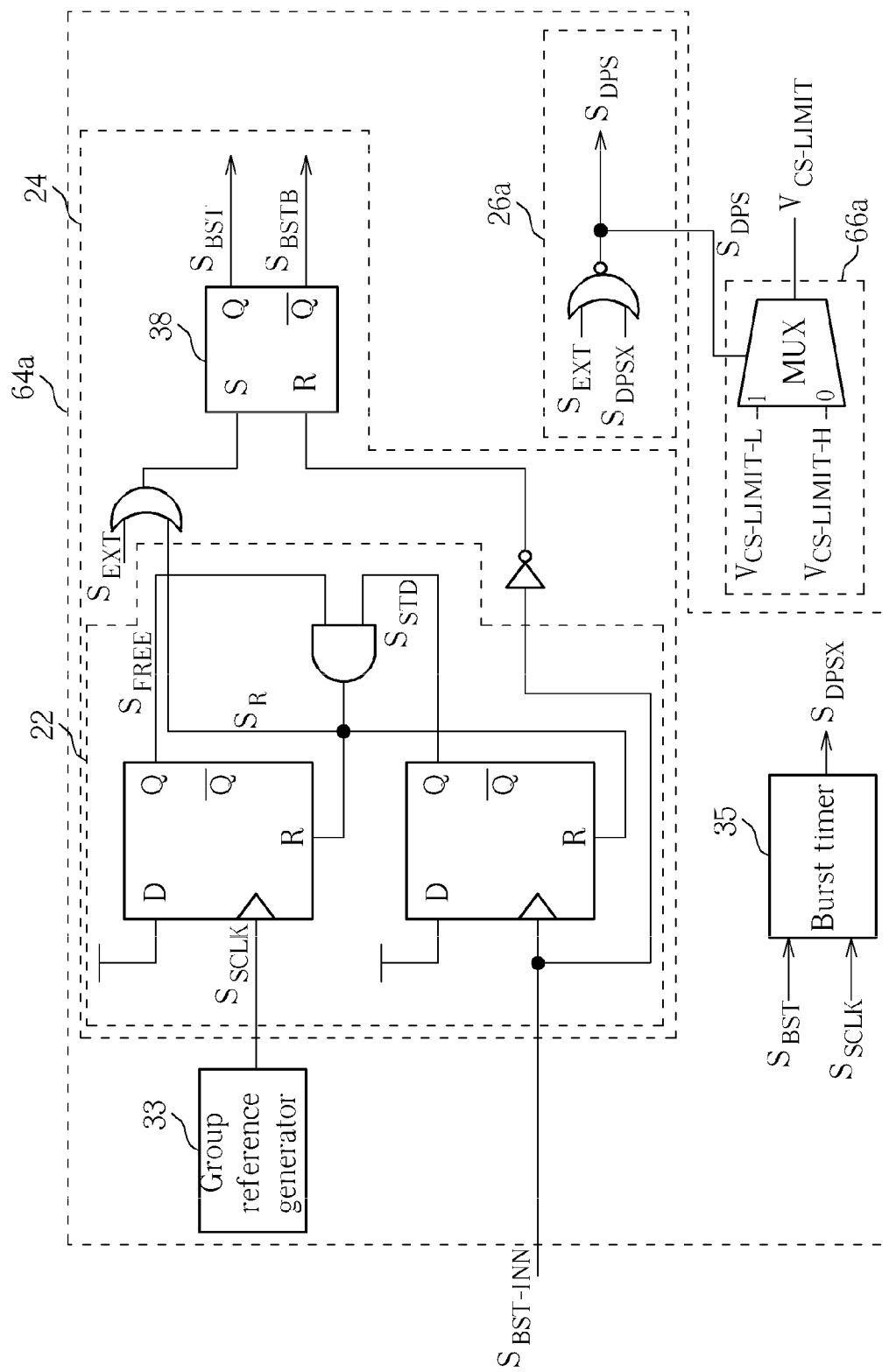
FIG. 15 is a diagram illustrating the phase controller and the peak limiter of FIG. 14.

FIG. 15 illustrates the phase controller 64a and the peak limiter 66a of FIG. 14. Simply said, the phase controller 64a controls the group period and the peak limiter 66a controls the power output in every switching cycle. Audible noise can be reduced by proper adjustment of the said controller and limiter.

The phase controller 64a comprises the reference generator 33, a suppression signal generator 26a, a burst timer 35, and the frequency limiter 24. The group reference signal generator 33 generates the group reference signal $S_{SCLK}$ with a frequency lower than the frequency of the clock signal $S_{CLK}$, which is explained in detail later. The frequency limiter 24 limits the group period corresponding to the burst signal $S_{BST}$ to be not lower than the period of the group reference signal $S_{SCLK}$. The burst timer 35 determines the burst up duration when the power supply 60 switches from the non-switching state to the switching state. A release signal $S_{DPSX}$ is disasserted (logic 0) within the burst up duration. If the exit signal $S_{EXT}$ remains at logic 0 within the burst up duration, the suppression signal $S_{DPS}$ remains at logic 1 and forces the peak limiter 66a to select a peak limit value $V_{CS-LIMIT-L}$, thus suppressing the power output to a very low level in every switching cycle. For instance, assumes the peak limit value $V_{CS-LIMIT-L}$ is 0.2V, if the suppression signal $S_{DPS}$ is logic 0, the peak limiter 66a selects a higher peak limit value $V_{CS-LIMIT-H}$. If the peak limit value $V_{CS-LIMIT-H}$ is 0.85V, and under normally heavy load conditions, the current sense signal $V_{CS}$ is limited by the compensation signal $S_{COM}$ and does not reach the peak limit value of $V_{CS-LIMIT-H}$.

Figure 16:
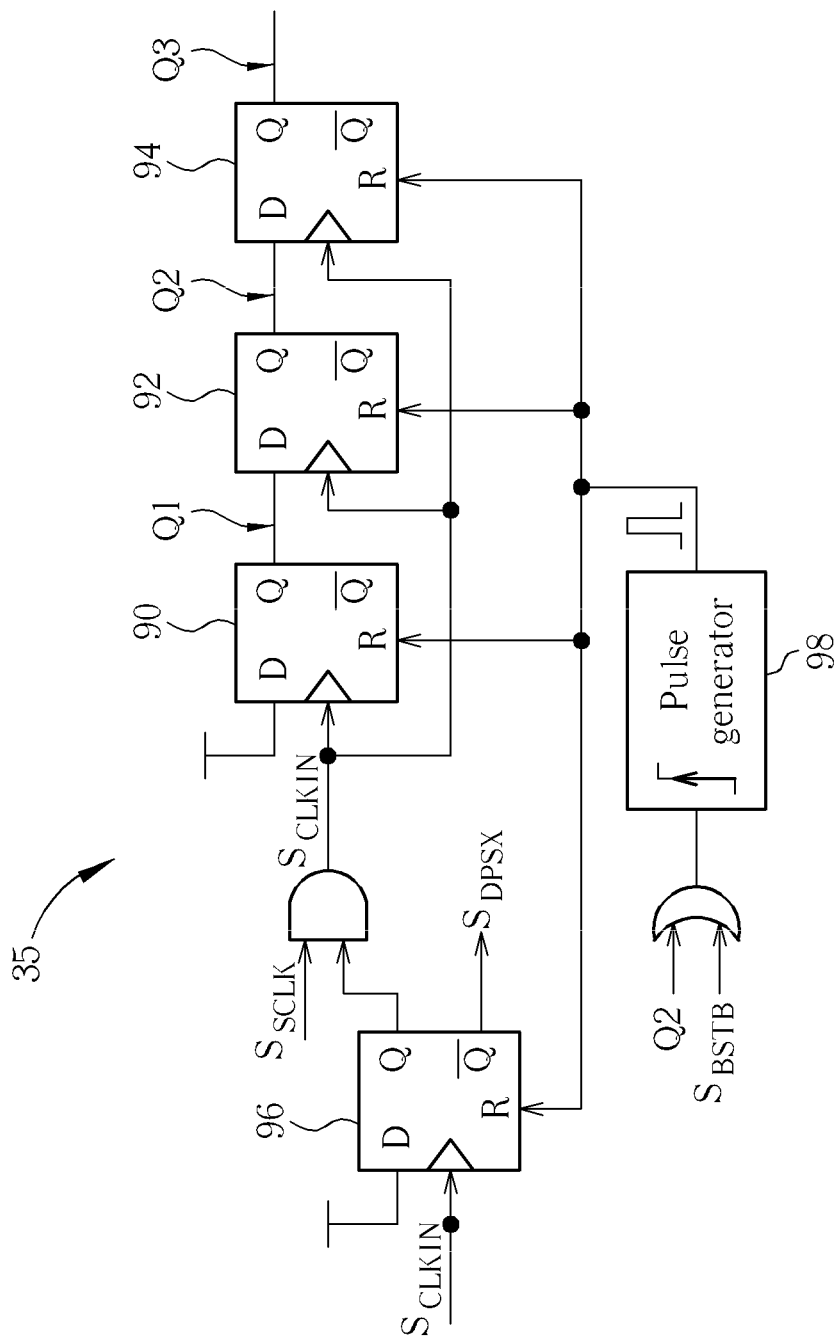
FIG. 16 is a diagram illustrating a burst timer of FIG. 15.
Figure 17:
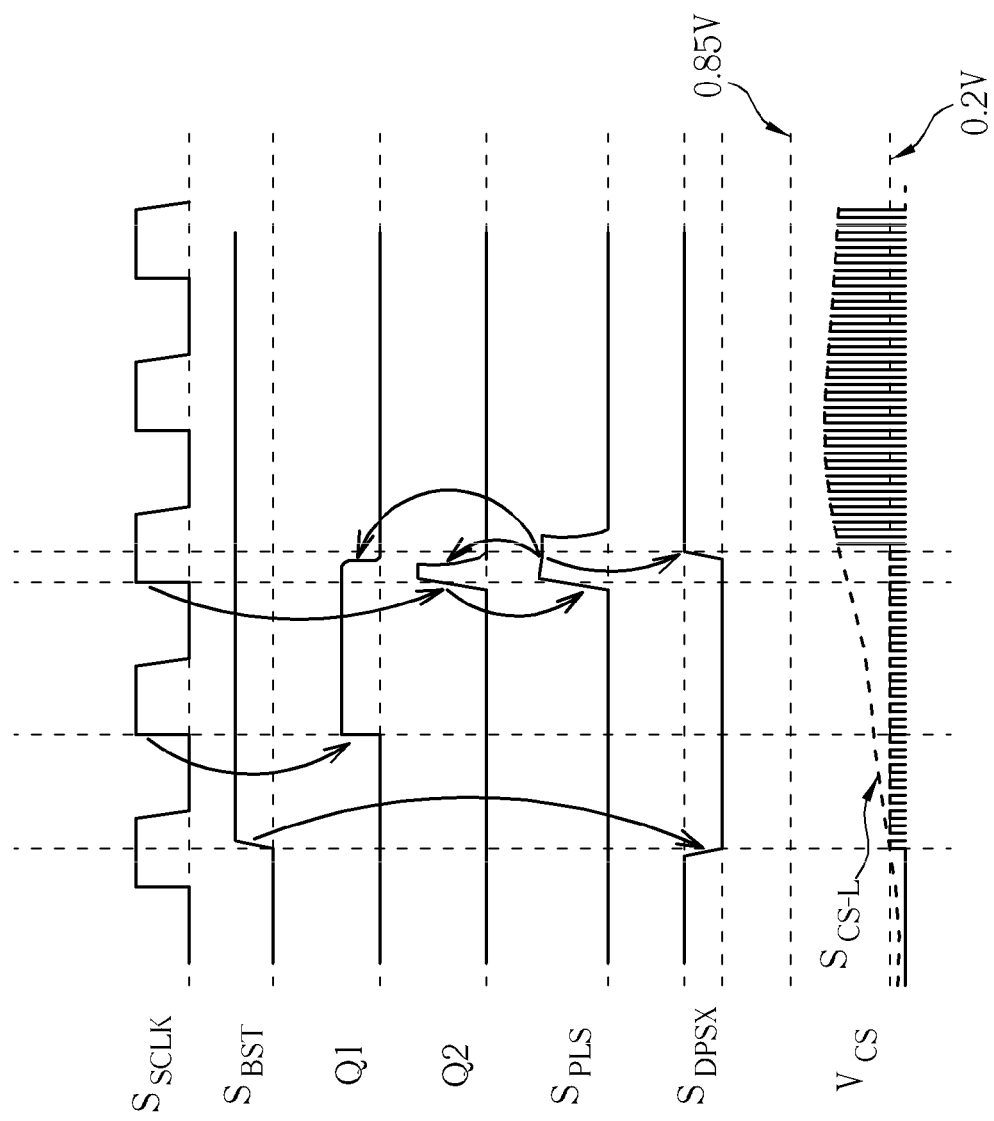
FIG. 17 is a diagram illustrating timing diagram of certain signals of FIG. 16 and FIG. 14.

FIG. 16 illustrates one embodiment of a burst timer 35. FIG. 17 illustrates some signal waveforms of FIG. 16 and FIG. 14. Assumes a plurality of outputs Q of D flip-flops 90, 92, 94, and 96 are initially logic 0. Only when the power supply 60 switches from the non-switching state to the switching state, and thereby asserts the burst signal $S_{BST}$ to logic 1, can the output Q of D flip-flop 96 being asserted to logic 1, and thereby transmits the group reference signal $S_{SCLK}$ to a plurality of clock inputs of D flip-flops 90, 92, and 94. D flip-flops 90, 92, and 94 can be regarded as a shift register, and the output Q is asserted to logic 1 in sequence according to the number of rising edges of the group reference signal $S_{SCLK}$. For instance, when the burst signal $S_{BST}$ changes from logic 0 to logic 1 and the group reference signal $S_{SCLK}$ rises for the first time, signal Q1 changes from logic 0 to logic 1; when the group reference signal $S_{SCLK}$ rises for the second time, signal Q2 changes from logic 0 to logic 1, as illustrated in FIG. 17. In FIG. 16, when signal Q2 changes from logic 0 to logic 1, a single pulse generator 98 outputs a short pulse signal $S_{PLS}$ to reset outputs Q of D flip-flops 90, 92, 94, and 96, to logic 0. From FIG. 17, as the burst signal $S_{BST}$ changes from logic 0 to logic 1, the release signal $S_{DPSX}$ changes from logic 1 to logic 0 and remains at logic 0 for over one reference cycle. The release signal $S_{DPSX}$ changes from logic 0 to logic 1 when signal Q2 changes from logic 0 to logic 1. The burst up duration is determined by the duration for which the release signal $S_{DPSX}$ remains 0. FIG. 17 also illustrates that, during the burst up duration, the peak value of the current sense signal $V_{CS}$ is fixed to around 0.2V (peak limit value $V_{CS-LIMIT-L}$) in every switching cycle. The peak value of the current sense signal $V_{CS}$ varies with the limit signal $S_{CS-L}$ outputted by the level shifter 67 in every switching cycle after the burst up duration.

Figure 18:
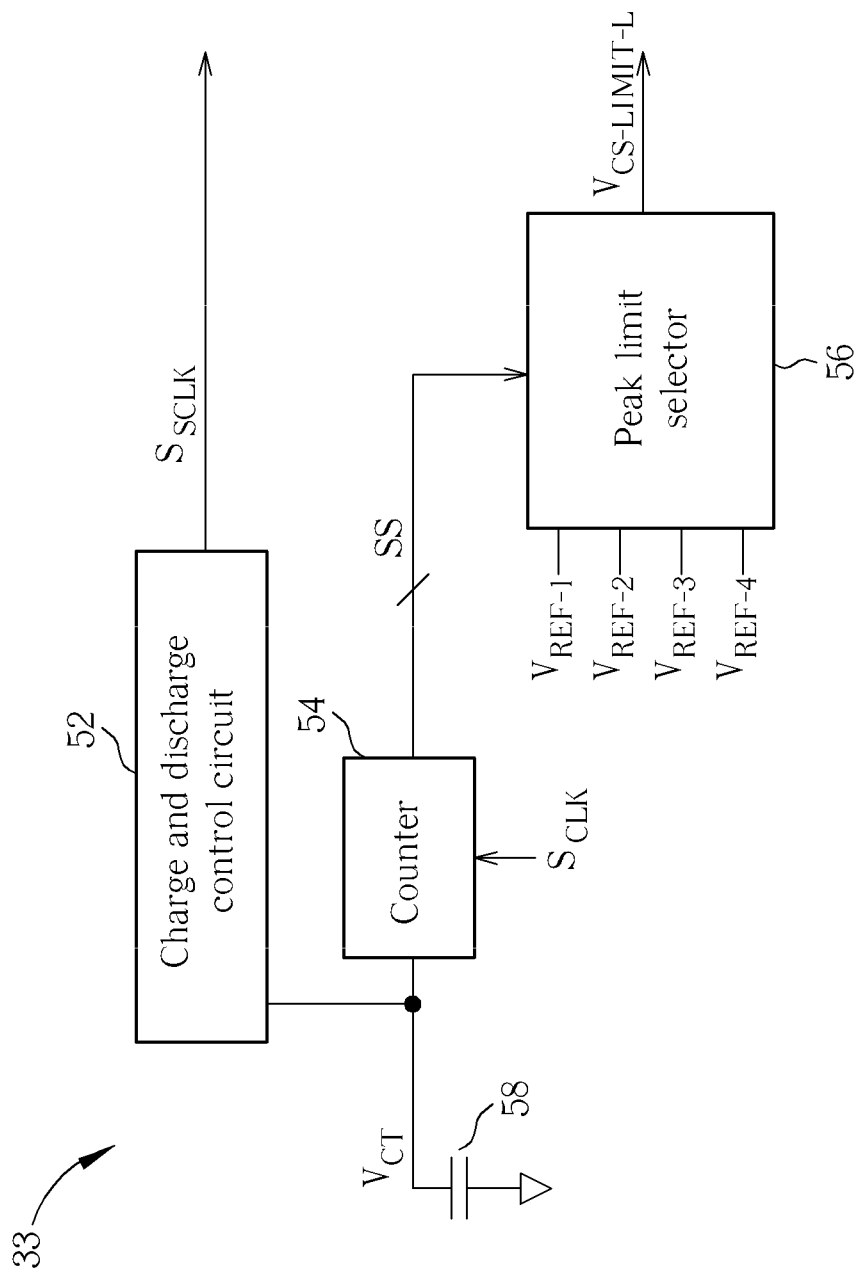
FIG. 18 is a diagram illustrating a group reference signal generator of FIG. 15.
Figure 19:
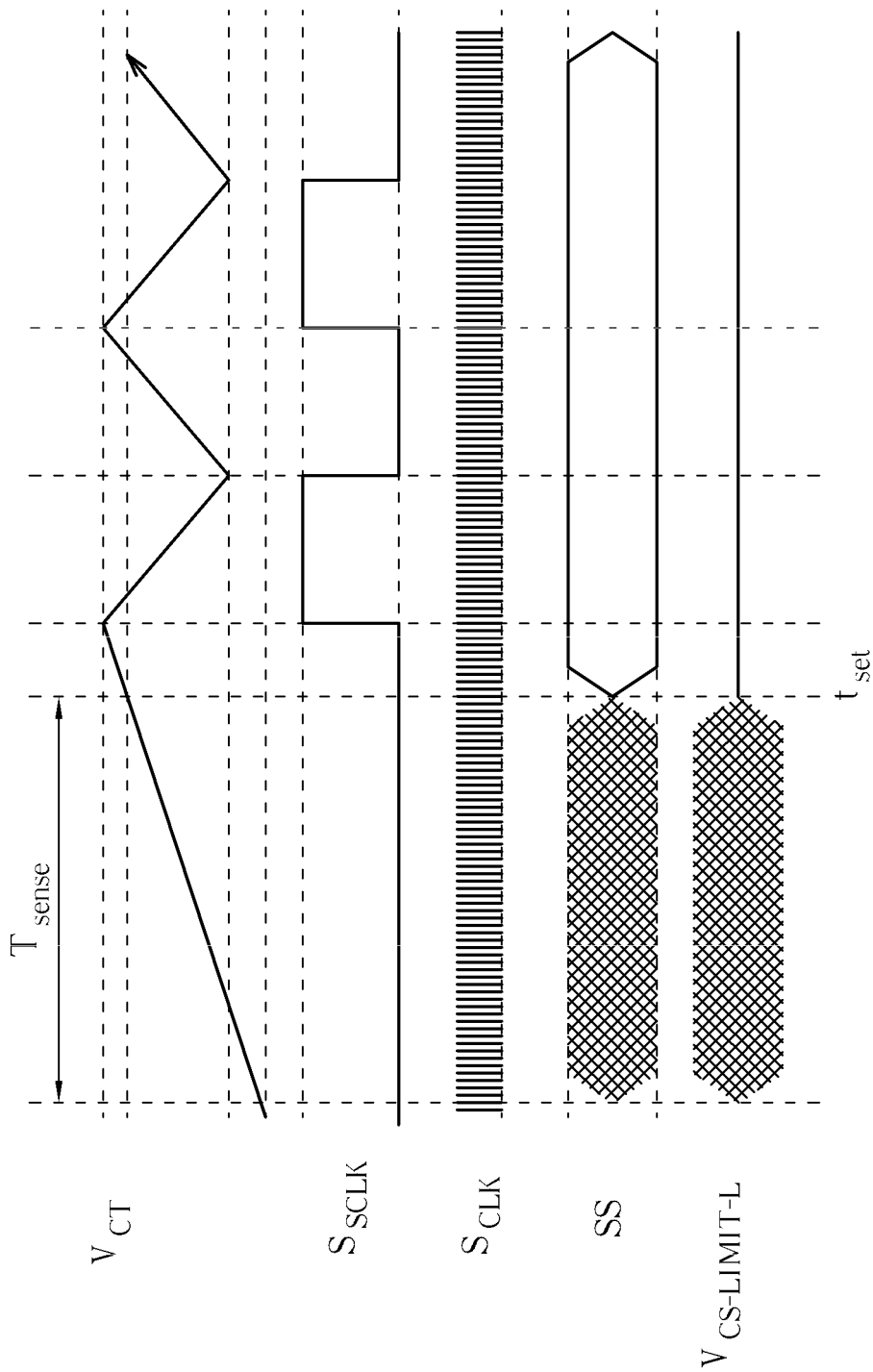
FIG. 19 is a diagram illustrating timing diagram of certain signals of FIG. 18.

FIG. 18 illustrates the group reference signal generator 33. FIG. 19 illustrates certain signal waveforms of FIG. 18. A charge and discharge control circuit 52 generates the group reference signal $S_{SCLK}$ according to a charge and discharge time of capacitor 58. In one embodiment, the charge and discharge circuit 52 is in a single chip integrated circuit, and connected to an externally connected capacitor through one pin of the single chip integrated circuit. A counter 54 counts the time $T_{sense}$ required for the terminal voltage $V_{CT}$ of capacitor 58 to climb from initial ground voltage to a predetermined voltage, and a result is indicated by SS. The larger the capacitor 58, the longer $T_{sense}$ is, and therefore the larger SS is. A peak limit selector 56 selects one reference voltage from $V_{REF-1}$, $V_{REF-2}$, $V_{REF-3}$, and $V_{REF-4}$ to be set as the peak limit value $V_{CS-LIMIT-L}$ according to the counting result SS. In other words, the peak limit value $V_{CS-LIMIT-L}$ is determined by proper selection of the externally connected capacitor 58.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power control circuit for controlling a power supply comprising:
    a clock generator for providing a clock signal for substantially determining switching cycles of the power supply;
    a phase controller for generating a burst signal having a period not smaller than a period of a group reference signal according to phases of the group reference signal and phases of a burst initiation signal for switching the power supply to a non-switching state or a switching state; and
    a power limiter for limiting a power output of the power supply in every switching cycle within a burst up duration not smaller than the period of the group reference signal after the power supply is switched from the non-switching state to the switching state;
    wherein the burst initiation signal is generated according to the power output of the power supply.

2. The power control circuit of claim 1, wherein the burst initiation signal is generated according to a compensation signal controlled by the power output of the power supply.

3. The power control circuit of claim 1, wherein the power supply comprises an inductor, and the power limiter limits a plurality of peaks of a current flowing through the inductor to a substantially predetermined value within the burst up duration.

4. The power control circuit of claim 1, wherein the power limiter limits the power output of the power supply to not exceeding a predetermined value in every switching cycle, the power control circuit further comprising:
    a power setting unit for setting the predetermined value according to a detected result related to an electronic component.

5. The power control circuit of claim 4, wherein the power control circuit is a single chip integrated circuit, the electronic component is an externally coupled capacitor, and the power control circuit further comprises:
    a group reference signal generator for charging and discharging the externally coupled capacitor for generating the group reference signal.

6. The power control circuit of claim 4, wherein the power setting unit comprises a counter, and the power setting unit selects the predetermined value from a plurality of predetermined values according to a counting result of the counter.

7. The power control circuit of claim 1 further comprising:
    a burst timer for determining the burst up duration.

8. A power control method for controlling a power supply comprising:
    generating a burst initiation signal according to a power output of the power supplier;
    generating a burst signal having a period not smaller than a period of a group reference signal according to the group reference signal and the burst initiation signal, wherein the burst initiation signal switches the power supply to a non-switching state or a switching state; and
    limiting the power output of the power supply in every switching cycle within a burst up duration not smaller than the period of the group reference signal after the power supply switches from the non-switching state to the switching state.

9. The power control method of claim 8 further comprising generating the burst initiation signal according to a compensation signal controlled by the power output of the power supply.

10. The power control method of claim 8 further comprising limiting a plurality of peaks of a current flowing through an inductor to a substantially predetermined value in every switching cycle within the burst up duration.

11. The power control method of claim 10 further comprising setting the predetermined value according to a detected result related to an electronic component.

12. The power control method of claim 10 wherein the power control method is adapted to a single chip integrated circuit, the electronic component is an externally coupled capacitor, and the method further comprises charging and discharging the externally coupled capacitor to generate the group reference signal.

13. The power control method of claim 8 further comprising determining the burst initiation signal according to the group reference signal and the burst signal.

14. A power control circuit for controlling a power supply, wherein the power supply may be in a non-switching state or a switching state, comprising:
    a clock generator for providing a clock signal for substantially determining switching cycles of the power supply;
    a group reference signal generator for generating a group reference signal having a period longer than a switching cycle of the clock signal;
    a burst timer for determining a burst up duration not smaller than a period of the group reference signal after the power supply switches from the non-switching state to the switching state; and
    a power limiter for limiting a power output of the power supply in every switching cycle within the burst up duration.

15. The power control circuit of claim 14, wherein the power limiter limits the power output of the power supply to not exceeding a predetermined value in every switching cycle, the power control circuit further comprising:
    a power setting unit for setting the predetermined value according to a detected result related to an electronic component.

16. The power control circuit of claim 15, wherein the power control circuit is a single chip integrated circuit, the electronic component is an externally coupled capacitor, and the group reference signal generator charges and discharges the externally coupled capacitor to generate the group reference signal.

17. The power control circuit of claim 15, wherein the power setting unit comprises a counter, and the power setting unit selects the predetermined value from a plurality of predetermined values according to a counting result of the counter.

\* \* \* \* \*